United States Patent
Miller et al.

(10) Patent No.: US 9,953,062 B2
(45) Date of Patent: Apr. 24, 2018

(54) SYSTEMS AND METHODS FOR PROVIDING FOR DISPLAY HIERARCHICAL VIEWS OF CONTENT ORGANIZATION NODES ASSOCIATED WITH CAPTURED CONTENT AND FOR DETERMINING ORGANIZATIONAL IDENTIFIERS FOR CAPTURED CONTENT

(71) Applicant: LexisNexis, a division of Reed Elsevier Inc., Miamisburg, OH (US)

(72) Inventors: Richard D. Miller, Yellow Springs, OH (US); Philip Wittmer, Dayton, OH (US); Michael Sluterbeck, Dayton, OH (US); Jacob Aaron Myers, Dayton, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 653 days.

(21) Appl. No.: 14/461,829

(22) Filed: Aug. 18, 2014

(65) Prior Publication Data
US 2016/0048518 A1    Feb. 18, 2016

(51) Int. Cl.
*G06F 17/30* (2006.01)
*G06F 3/0481* (2013.01)

(52) U.S. Cl.
CPC ...... *G06F 17/3053* (2013.01); *G06F 3/04817* (2013.01); *G06F 17/30864* (2013.01)

(58) Field of Classification Search
CPC ........... G06F 17/3053; G06F 17/30864; G06F 3/04817
See application file for complete search history.

(56) References Cited

U.S. PATENT DOCUMENTS

| 6,947,936 B1 | 9/2005 | Suermondt et al. |
| 7,174,536 B1 * | 2/2007 | Kothari ............... G06F 11/3664 717/105 |

(Continued)

FOREIGN PATENT DOCUMENTS

WO    2003042865    5/2003

OTHER PUBLICATIONS

International Search Report and Written Opinion dated Dec. 28, 2015 for PCT/US2015/045031 filed Aug. 13, 2015. pp. 1-13.

*Primary Examiner* — Jared M Bibbee
(74) *Attorney, Agent, or Firm* — Dinsmore & Shohl LLP

(57) ABSTRACT

Systems and methods for providing for display hierarchical views of content organization nodes associated with captured content and for determining organizational identifiers for captured content are disclosed. A method includes providing a hierarchical taxonomy including a plurality of nodes. The method further includes receiving a plurality of captured content items. The method further includes associating a plurality of content organization nodes from the plurality of nodes with the plurality of captured content items. Each of the plurality of captured content items is associated with at least one of the plurality of content organization nodes. The method further includes providing for display a hierarchical view including the plurality of content organization nodes. The hierarchical view includes, for each of the plurality of content organization nodes, a graphical representation that the content organization node is associated with at least one of the plurality of captured content items.

16 Claims, 9 Drawing Sheets

(56) References Cited

U.S. PATENT DOCUMENTS

| | | |
|---|---|---|
| 7,483,904 B2 | 1/2009 | Owen et al. |
| 7,685,198 B2 | 3/2010 | Xu et al. |
| 7,797,271 B1 | 9/2010 | Bonneau et al. |
| 8,086,504 B1 | 12/2011 | Dicker et al. |
| 8,103,646 B2 | 1/2012 | Brown |
| 8,140,570 B2 | 3/2012 | Ingrassia et al. |
| 8,170,916 B1 | 5/2012 | Dicker et al. |
| 8,271,539 B2 | 9/2012 | Huitema |
| 8,407,216 B2 | 3/2013 | Walker et al. |
| 8,566,329 B1 | 10/2013 | Freed et al. |
| 9,367,814 B1 * | 6/2016 | Lewis ................. G06N 99/005 |
| 2002/0010708 A1 | 1/2002 | McIntosh |
| 2002/0124006 A1 | 9/2002 | Parnell et al. |
| 2006/0288023 A1 | 12/2006 | Szabo |
| 2006/0294191 A1 | 12/2006 | Marston et al. |
| 2007/0033221 A1 * | 2/2007 | Copperman ...... G06F 17/30616 |
| 2007/0112876 A1 | 5/2007 | Blaisdell et al. |
| 2007/0271291 A1 | 11/2007 | Acharya |
| 2010/0274750 A1 | 10/2010 | Oltean et al. |
| 2011/0225162 A1 | 9/2011 | Lyon |
| 2011/0264495 A1 | 10/2011 | Hailey et al. |
| 2011/0307243 A1 | 12/2011 | Miller et al. |
| 2012/0010995 A1 | 1/2012 | Skirpa et al. |
| 2012/0054194 A1 * | 3/2012 | Gao ................. G06F 17/30964 707/741 |
| 2012/0072419 A1 | 3/2012 | Moganti et al. |
| 2012/0072420 A1 | 3/2012 | Moganti et al. |
| 2012/0072463 A1 | 3/2012 | Moganti et al. |
| 2012/0109962 A1 * | 5/2012 | Morscher ......... G06F 17/30707 707/737 |
| 2012/0203802 A1 * | 8/2012 | Brown ............. G06F 17/30997 707/803 |
| 2013/0198193 A1 * | 8/2013 | Chitiveli .......... G06F 17/30707 707/740 |
| 2013/0311475 A1 * | 11/2013 | Emanuel .......... G06F 17/30731 707/740 |
| 2014/0101122 A1 * | 4/2014 | Oren ................. G06F 17/30961 707/706 |
| 2014/0108285 A1 * | 4/2014 | Varadarajan .......... G06Q 50/20 705/326 |
| 2015/0026260 A1 * | 1/2015 | Worthley ............. G06Q 10/10 709/204 |
| 2015/0206180 A1 * | 7/2015 | Iyer ................... G06Q 30/0251 705/14.49 |

* cited by examiner

SYSTEMS AND METHODS FOR PROVIDING FOR DISPLAY HIERARCHICAL VIEWS OF CONTENT ORGANIZATION NODES ASSOCIATED WITH CAPTURED CONTENT AND FOR DETERMINING ORGANIZATIONAL IDENTIFIERS FOR CAPTURED CONTENT

BACKGROUND

Field

The present specification generally relates to displaying information pertaining to captured content and to processing captured content and, more particularly, to systems and methods for providing for display hierarchical views of content organization nodes associated with captured content and for determining organizational identifiers for captured content.

Technical Background

A team of users may review a variety of content and/or documents in order to perform a task, such as information collection, legal research, or the like. As the users of the team review multiple pieces of content, the users may wish to capture content from several of the sources for later review or analysis. It may be difficult for the users to recall how various pieces of captured content are classified or relate to other pieces of captured content, particularly when a variety of content is captured for later use. It may also be difficult and cumbersome for the users to organize such captured content. Furthermore, it may be difficult for each user of team to keep track of content captured by other members of the team and understand how the content captured by the team is related. Even in a context in which only a single user captures content from a variety of sources, it may be difficult for the user to recall how various pieces of captured content are classified or relate to other pieces of captured content.

Accordingly, a need exists for alternative systems and methods for providing for display hierarchical views of content organization nodes associated with captured content and for determining organizational identifiers for captured content.

SUMMARY

In one embodiment, a method for providing for display a hierarchical view including content organization nodes associated with captured content items includes providing a hierarchical taxonomy including a plurality of nodes. The method further includes receiving, at a computer, a plurality of captured content items. The method further includes associating a plurality of content organization nodes from the plurality of nodes with the plurality of captured content items. Each of the plurality of captured content items is associated with at least one of the plurality of content organization nodes. The method further includes providing for display a hierarchical view including the plurality of content organization nodes. The hierarchical view includes, for each of the plurality of content organization nodes, a graphical representation that the content organization node is associated with at least one of the plurality of captured content items.

In another embodiment, a method for providing for display a hierarchical view including content organization nodes associated with captured content items includes providing a hierarchical taxonomy including a plurality of nodes. The method further includes receiving, at a computer, a plurality of captured content items. The plurality of captured content items include a first captured content item and a second captured content item. The method further includes associating a plurality of content organization nodes from the plurality of nodes with the plurality of captured content items. The plurality of content organization nodes include a first content organization node and a second content organization node. The first captured content item is associated with the first content organization node. The second captured content item is associated with the second content organization node. The method further includes providing for display a hierarchical view including the plurality of content organization nodes. The hierarchical view includes a graphical representation that the first captured content items is associated with the first content organization node and that the second captured content item is associated with the second content organization node. The graphical representation includes a first capture attribute icon displayed near the first content organization node and a second capture attribute icon displayed near the second content organization node. The first capture attribute icon is indicative of an attribute pertaining to a capturing of the first captured content item. The second capture attribute icon is indicative of an attribute pertaining to a capturing of the second captured content item.

In yet another embodiment, a method of determining an organizational identifier for captured content includes receiving, at a computer, a captured content item. The method further includes associating a plurality of content organization nodes with the captured content item, and determining the organizational identifier for the captured content item based on the plurality of content organization nodes.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to systems and methods for providing for display hierarchical views of content organization nodes associated with captured content and for determining organizational identifiers for captured content. A method for providing for display a hierarchical view of content organization nodes associated with captured content includes providing a hierarchical taxonomy including a plurality of nodes, receiving captured content, associating a plurality of content organization nodes with the captured content, and providing for display a hierarchical view including a graphical representation of the association of the content organization nodes with the captured content. By presenting a hierarchical view depicting content organization nodes associated with various captured content items, a user may intuitively and efficiently understand the subject matter or classification of multiple pieces of captured content from a quick visual review of the displayed hierarchical view. Furthermore, such a hierarchical view may facilitate the review and collaboration of a team of users that wish to capture and share content with one another. A method of determining an organizational identifier for captured content includes receiving captured content, associating a plurality of content organization nodes with the captured content, and determining an organizational identifier for the captured content based on the plurality of content organization nodes. By determining organizational identifiers for captured content based on content organization nodes, captured content may be better organized and classified for later retrieval and analysis. Various embodiments of systems and methods for providing for display hierarchical views of content organization nodes associated with captured content and for determining organizational identifiers for captured content are described below.

As used herein, the term "captured content item" means a document, portion of a document, image, audio recording, video, webpage, or the like that is captured for storage or later use by a user (e.g., when a user indicates that the content is to be saved for later retrieval, classified, organized, or the like).

Figure 1:
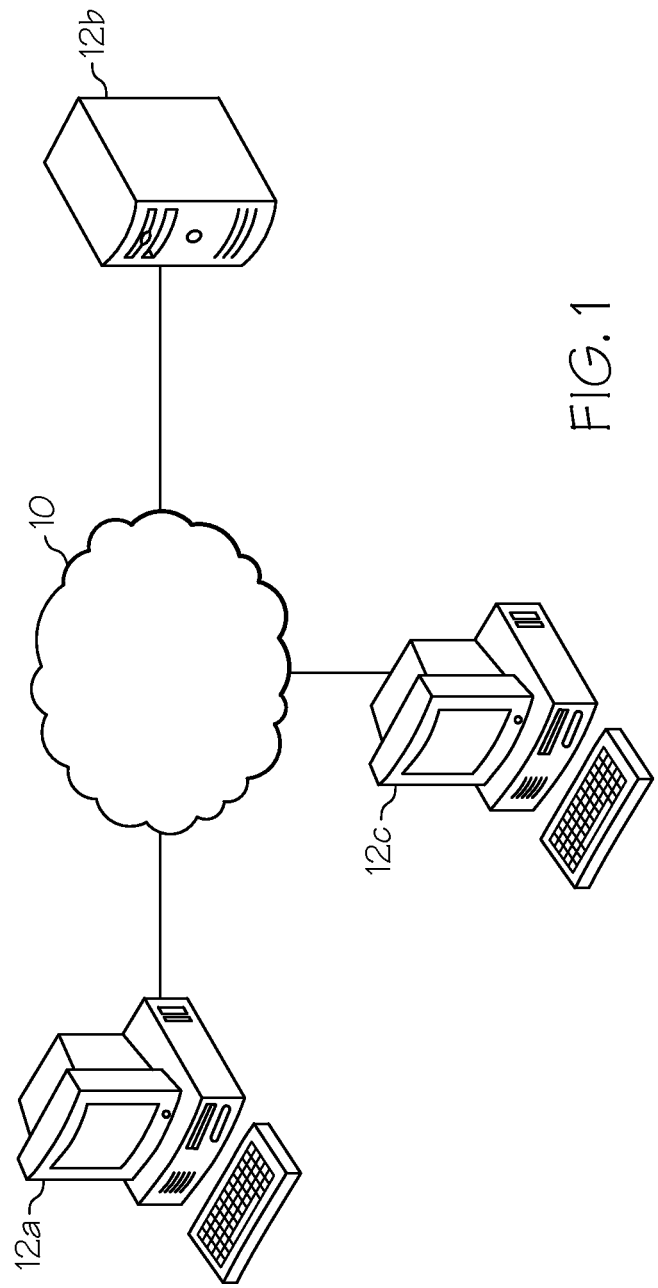
FIG. 1 depicts a schematic illustration of a computing network for a system for providing for display hierarchical views of content organization nodes associated with captured content and for determining organizational identifiers for captured content, according to one or more embodiments shown and described herein.

Referring now to the drawings, FIG. 1 depicts an exemplary computing network, illustrating components for a system for providing for display hierarchical views of content organization nodes associated with captured content and for determining organizational identifiers for captured content, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

Still referring to FIG. 1, the user computing device 12a may be used to facilitate the capturing of content and the viewing of the graphical user interfaces and hierarchical views described herein. The user computing device 12a may also be utilized to perform other user functions.

Still referring to FIG. 1, the administrator computing device 12c may, among other things, perform administrative functions for the server computing device 12b. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to provide a hierarchical taxonomy including a plurality of nodes, as will be described in detail below.

Still referring to FIG. 1, the server computing device 12b may receive captured content and associate content organization nodes with the captured content. The server computing device 12b may also receive captured content, associate content organization nodes with the captured content, and determine an organizational identifier for the captured content based on the content organization nodes. The server computing device 12b may also transmit information to the user computing device 12a such that the user computing device 12a may display information pertaining to captured content, such as hierarchical views of content organization nodes relevant to captured content, or the like. The components and functionality of the server computing device 12b will be set forth in detail below.

It should be understood that while the user computing device 12a and the administrator computing device 12c are depicted in FIG. 1 as personal computers and the server computing device 12b is depicted as a server, these are nonlimiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, etc.

Figure 2:
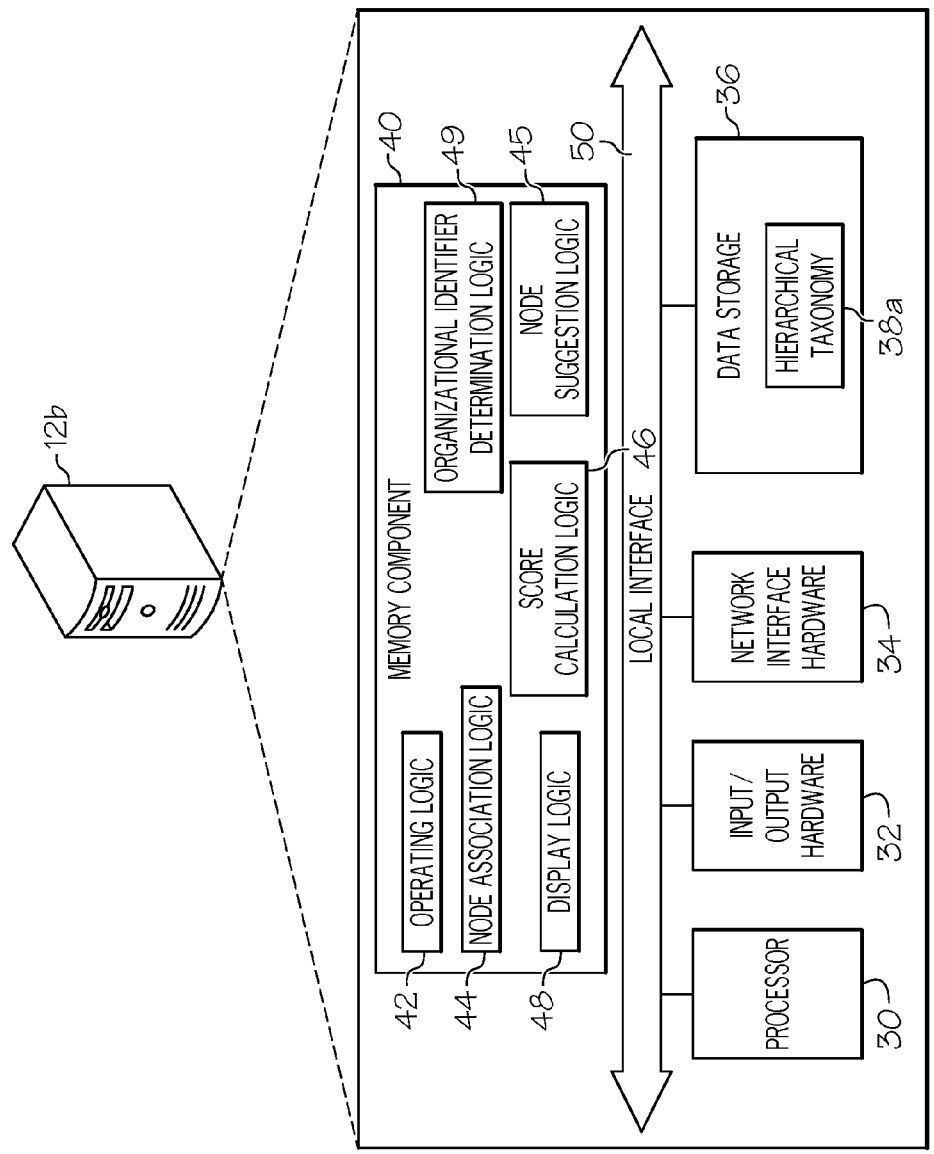
FIG. 2 depicts a schematic illustration of the server computing device from FIG. 1, further illustrating hardware and software that may be utilized in providing for display hierarchical views of content organization nodes associated with captured content and for determining organizational identifiers for captured content, according to one or more embodiments shown and described herein.

FIG. 2 depicts the server computing device 12b, from FIG. 1, further illustrating a system for providing for display hierarchical views of content organization nodes associated with captured content and for determining organizational identifiers for captured content, according to embodiments shown and described herein. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store a hierarchical taxonomy 38a), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, node association logic 44, node suggestion logic 45, score calculation logic 46, display logic 48, and organizational identifier determination logic 49 (each of which may be embodied as a computer program, firmware, or hardware, as an example). A local interface 50 is also included in FIG. 2 and may be implemented as a bus or other interface to facilitate communication among the components of the server computing device 12b.

Still referring to FIG. 2, the processor 30 may include any processing component configured to receive and execute instructions (such as from the data storage component 36 and/or the memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

Still referring to FIG. 2, the data storage component 36 may reside local to and/or remote from the server computing device 12b and may be configured to store one or more pieces of data for access by the server computing device 12b and/or other components. As illustrated in FIG. 2, the data storage component 36 may store the hierarchical taxonomy 38a. The hierarchical taxonomy 38a includes a plurality of nodes, which may facilitate the classification or organization of content when one or more of the content organization nodes are associated with the content. The hierarchical taxonomy 38a generally has a tree-like structure including nodes at multiple levels of the tree. The nodes at higher levels of the hierarchical taxonomy 38a are typically more general and nodes at lower levels of the hierarchical taxonomy 38a are typically more specific. A parent node of the hierarchical taxonomy 38a may have one or more children nodes that relate to more specific topics or subjects of the more general topic or subject of the parent node. For example, referring to FIG. 6, a legal hierarchical taxonomy is depicted. The legal hierarchical taxonomy may facilitate the classification or organization of content by legal topics, where the nodes on the left of the depicted legal hierarchical taxonomy are more general topics and the nodes to the right become more specific. The depicted legal hierarchical taxonomy of FIG. 6 includes an "Antitrust & Trade Law" area of law node. The "Antitrust & Trade Law" area of law node includes a number of child nodes (e.g., "Exemptions & Immunities," "Regulated Practices," and "Sherman Act), each of which is related to a sub-topic within the Antitrust & Trade Law area of law. Each of these child nodes have child nodes that are related to even more specific sub-topics (e.g., the "Regulated Practices" node includes "Monopolies & Monopolization," "Price Fixing & Restraints of Trade," and "Private Actions" child nodes, each of which is a sub-topic of the Regulated Practices sub-topic of Antirust & Trade Law). Content (e.g., legal cases, head notes of legal cases, law review articles, web articles, news articles, statutes, or the like) may be associated with one or more of the nodes of the taxonomy to classify or organize the content by legal topic. While the hierarchical taxonomy 38a described herein is related to a hierarchical taxonomy of legal topics for classifying or organizing content by legal topic, it should be understood that other embodiments may include other types of hierarchical taxonomies, such as hierarchical taxonomies of organizations (e.g., organizational charts), hierarchical taxonomies of news topics, hierarchical taxonomies of entities, or the like. Furthermore, while the embodiments disclosed herein are described in the context of a hierarchical taxonomy 38a, it should be understood that embodiments are not limited thereto. For example, in some embodiments data assets used by the embodiments herein may not be hierarchical taxonomies.

Referring once again to FIG. 2, the hierarchical taxonomy 38a may be stored in one or more data storage devices. In another embodiment, the server computing device 12b may be coupled to a remote server or data storage device that comprises one or more of the documents in the hierarchical taxonomy 38a. Other data may be stored in the data storage component 36 to provide support for functionalities described herein.

Still referring to FIG. 2, included in the memory component 40 are the operating logic 42, the node association logic 44, the node suggestion logic 45, the score calculation logic 46, the display logic 48, and the organizational identifier determination logic 49. The operating logic 42 may include an operating system and/or other software for managing components of the server computing device 12b. Similarly, the node association logic 44 may reside in the memory component 40 and may be configured to identify content organization nodes from nodes in a hierarchical taxonomy and associate such content organization nodes with captured content, as will be described in detail below. The node suggestion logic 45 may generate a suggested content organization node for association with captured content, and may be transmitted to the user computing device 12a for display to a user. The score calculation logic 46 may be operable to calculate a strength of organizational fit score indicative of a degree to which a node is relevant to captured content. The display logic 48 may facilitate the display graphical user interfaces as described herein and/or hierarchical views of content organization nodes as described herein. The display logic 48 may facilitate the display of such information on the user computing device 12a by transmitting information that is displayed by the user computing device 12a. The organizational identifier determination logic 49 may determine an organizational identifier for captured content based on content organization nodes associated with the captured content. The functionalities of the node association logic 44, the node suggestion logic 45, the score calculation logic 46, the display logic 48, and the organizational identifier determination logic 49 will be described in further detail below.

It should be understood that the components illustrated in FIG. 2 are merely exemplary and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
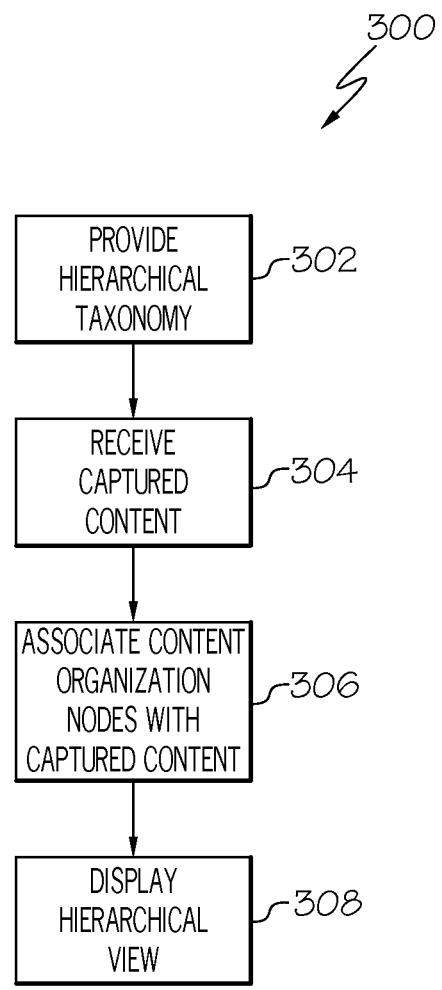
FIG. 3 depicts a flowchart for a method of providing for display a hierarchical view of content organization nodes associated with captured content, according to one or more embodiments shown and described herein.

Referring now to FIG. 3, a flowchart that graphically illustrates a method 300 of providing for display a hierarchical view of content organization nodes associated with captured content is provided. Although the steps associated with the blocks of FIG. 3 will be described as being separate tasks, in other embodiments, the blocks may be combined or omitted. Further, while the steps associated with the blocks of FIG. 3 will described as being performed in a particular order, in other embodiments, the steps may be performed in a different order.

Still referring to FIG. 3, at block 302, a hierarchical taxonomy is provided. For example, in some embodiments, the hierarchical taxonomy 38a is provided in the data storage component 36. In other embodiments, the hierarchical taxonomy may be transmitted to the server computing device 12b. As described in detail above, the provided hierarchical taxonomy includes a plurality of nodes, which may facilitate the classification or organization of captured content items when one or more of the content organization nodes are associated with the captured content items. The hierarchical taxonomy 38a generally has a tree-like structure including nodes at multiple levels of the tree. The nodes at higher levels of the hierarchical taxonomy 38a are typically more general and nodes at lower levels of the hierarchical taxonomy 38a are typically more specific. A parent node of the hierarchical taxonomy 38a may have one or more children nodes that relate to more specific topics or subjects of the more general topic or subject of the parent node. In some embodiments, the hierarchical taxonomy 38a may be represented by the server computing device 12b in an XML representation (e.g., an XML representation in which each node includes a node identifier and a node name), though other embodiments may represent or store the hierarchical taxonomy 38a in other manners, such as with a linked list, an array, or the like.

Figure 5:
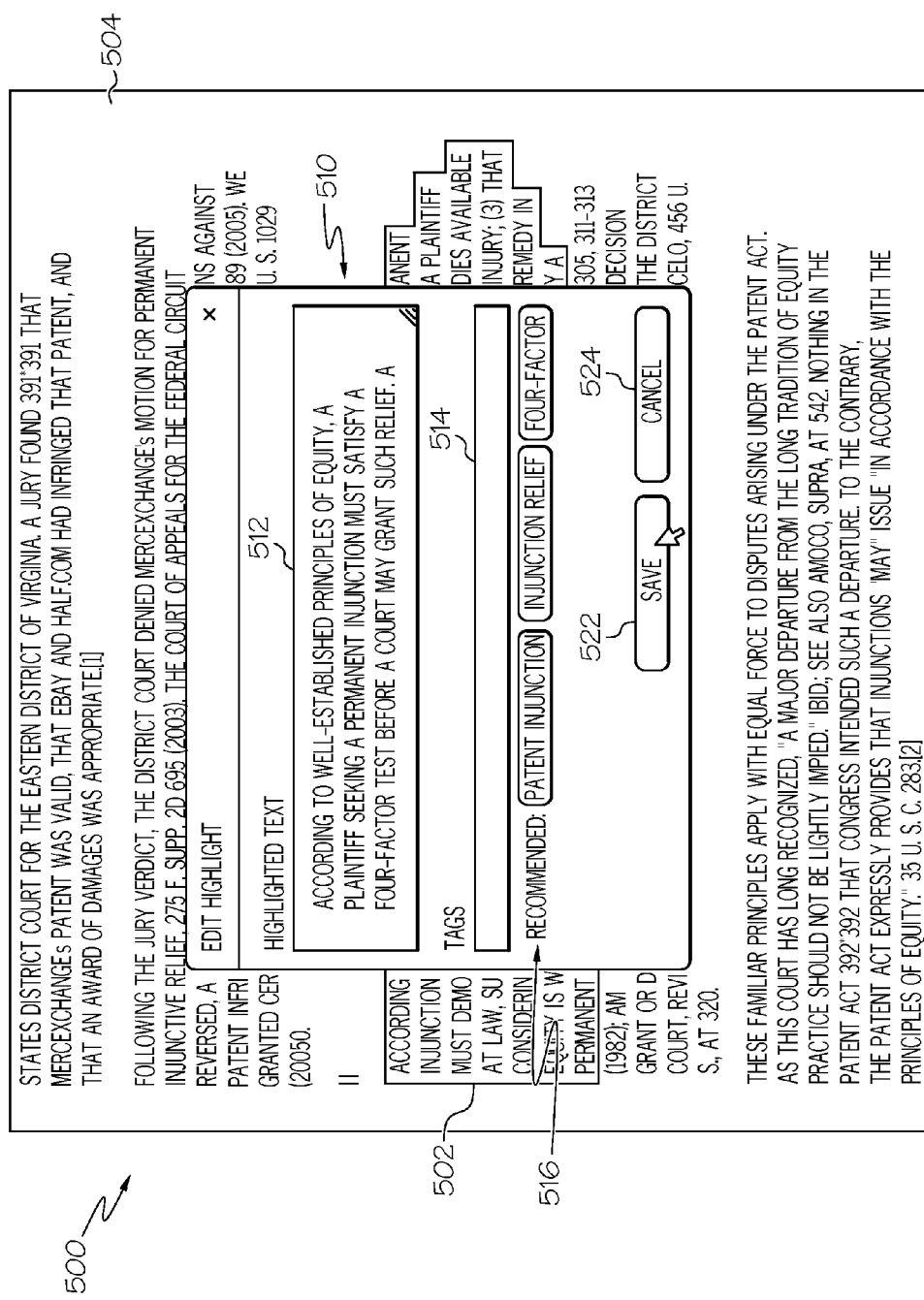
FIG. 5 depicts a schematic illustration of a graphical user interface for capturing content, according to one or more embodiments shown and described herein.

Still referring to FIG. 3, at block 304, a plurality of captured content items are received by the server computing device 12b. As noted above, the captured content items may include a document, a portion of a document, an image, an audio recording, a video, a webpage, or the like that is captured by a user. The captured content items may be captured in a variety of ways, such as when a user indicates that the content item is to be saved for later retrieval, classified, organized, or the like. By way of noon-limiting example, FIG. 5 schematically depicts a graphical user interface 500 that may be used to capture content items, as described herein. The graphical user interface 500 may be displayed on a display of the user computing device 12a. The graphical user interface 500 may include a content display area 504 and an edit highlight dialog box 510. The content display area 504 may display a document, such as a court opinion, or the like. A user may select a highlighted portion 502 of the displayed document for capturing as captured content by dragging a mouse cursor over the highlighted portion 502, or otherwise selecting the highlighted portion 502.

Still referring to FIG. 5, in some embodiments, in response to a user selecting the highlighted portion 502, the user computing device 12a or the server computing device 12b may provide for display the edit highlight dialog box 510. The edit highlight dialog box 510 may include a highlighted text portion 512, a tag input box 514, a recommended content organization node area 516, a save button 522, and a cancel button 524. The highlighted text portion 512 includes the text of the highlighted portion 502 of the document that was selected by the user. The tag input box 514 may allow a user to associate one or more tags or content organization nodes with the highlighted text portion 512. The recommended content organization node area 516 may include one or more recommended or suggested content organization nodes or tags for association with the highlighted text portion 512, as will be described in detail below. The save button 522 may be manipulated by a user to capture the highlighted text portion 512 as a captured content item. The cancel button 524 may be manipulated by a user to cancel the capturing of the highlighted text portion 512 as captured content.

By way of a non-limiting example that will be carried through the description of FIG. 3 to help illustrate the functionality described herein, a team of three users, Don, Gary, and Peter, may be researching the issue of whether NCAA athletes should be compensated. As part of the team's research, each user may review several different types of content items, such as webpages, legal documents, videos, audio recordings, or the like. As the users search the NCAA athlete compensation issue, the users may wish to capture content items that the users believe may be useful to review later. Don may capture a first captured content item, Gary may capture a second captured content item, Peter may capture a third captured content item, Don may capture a fourth captured content item, and Peter may capture a fifth captured content item. Each of the captured content items may be captured in any suitable manner, such as by highlighting or otherwise selecting the content to be captured.

Still referring to the non-limiting example, the first captured content item captured by Don is the following portion of an ABA Journal web article: "[t]he proposed class action claims the defendants restrict competition by capping scholarship amounts. 'As a result of these illegal restrictions,' the suit says, 'market forces have been shoved aside and substantial damages have been inflicted upon a host of college athletes whose services have yielded riches only for others. This class action is necessary to end the NCAA's unlawful cartel, which is inconsistent with the most fundamental principles of antitrust law." (http://www.abajournal.com/news/article/new_antitrust_suit_against_ncaa_says_players_should_be_allowed_to_share_the; accessed Jun. 6, 2014). In response to Don highlighting or otherwise selecting the first captured content item (e.g., in the manner described above with respect to FIG. 5), the server computing device 12b may receive the first captured content item.

Still referring to the carried through non-limiting example, the second captured content item captured by Gary is the following paragraph highlighted by Gary from a legal complaint: "Each person in each class is, has been, and/or will be subject to uniform agreements, rules, and practices among the Defendants that restrain competition for player services, including, but not limited to, the NCAA Bylaws and conference rules set forth herein, and any and all similar player restraints that are or will be uniformly imposed by the Defendants on members of each class. Indeed, the NCAA rules at issue apply uniformly to all members of each respective class." (Complaint And Jury Demand—Class Action Seeking Injunction And Individual Damages at p. 9, *Jenkins et al. v NCAA et al.*, D. N.J., 2014). In response to Gary highlighting or otherwise selecting the second captured content item (e.g., in the manner described above with respect to FIG. 5), the server computing device 12b may receive the second captured content item.

Still referring to the carried through non-limiting example, the third captured content item captured by Peter is the following portion of a New York Times newspaper article that Peter highlighted: "The N.C.A.A. has neither an antitrust exemption nor a player's union to negotiate with. In other words, it lacks some of the legal protections that shield professional sports from antitrust suits. What it has, instead, is a work force full of young adults dreaming of becoming pros and willing to sign any document, no matter how onerous, if it will help them reach that goal. The document the N.C.A.A. forces them to sign completely stacks the deck against them." (http://www.nytimes.com/2011/12/31/opinion/nocera-the-college-sports-cartel.html?_r=0; accessed Jul. 28, 2014). In response to Peter highlighting or otherwise selecting the third captured content item (e.g., in the manner described above with respect to FIG. 5), the server computing device 12b may receive the third captured content item.

Still referring to the carried through non-limiting example, Don captured the fourth captured content item from a legal case that he was reviewing: "As plaintiff failed to allege an anticompetitive effect upon an unidentifiable market caused by defendant's no-agent and no-draft rules for college athletes, plaintiff failed to state a cause of action under the Sherman Act." In response to Don highlighting or otherwise selecting the fourth captured content item (e.g., in the manner described above with respect to FIG. 5), the server computing device 12b may receive the fourth captured content item.

Still referring to the carried through non-limiting example, Peter captured the fifth captured content item from a legal case that he was reviewing: "Court affirmed lower court's findings of price fixing, monopolization of the market, and group boycotts in violation of Sherman Act; reversed lower court's injunction for reconsideration on issues of breadth and vagueness." In response to Peter highlighting or otherwise selecting the fifth captured content item (e.g., in the manner described above with respect to FIG. 5), the server computing device 12b may receive the fifth captured content item.

Referring once again to FIG. 3, at block 306, the node association logic 44 stored in the memory component 40, when executed by the processor 30, causes the server computing device to associate a plurality of content organization nodes (from the plurality of nodes of the hierarchical taxonomy 38a) with the plurality of captured content items received at block 304. Each of the plurality of captured content items is associated with at least one of the plurality of content organization nodes. In some embodiments, only one content organization node is identified for each of the plurality of captured content items (i.e. a "best" content organization node for each of the plurality of captured content items). In other embodiments, more than one content organization node is identified for each of the plurality of captured content items. The content organization nodes may be associated with the plurality of captured content items by linking the content organization nodes to the captured content items in the memory component 40. By associating content organization nodes with the captured content items, the captured content items may be better organized or classified and a hierarchical view depicting the content organization nodes may be presented for display, facilitating an intuitive and efficient way for a user to understand the organization or classification of the captured content items by viewing the hierarchical view, as will be described below.

Still referring to block 306 of FIG. 3, in some embodiments, the content organization nodes that are associated with the captured content items may be identified from the universe of nodes of the hierarchical taxonomy 38a based on a strength of organizational fit score calculated for the nodes of the hierarchical taxonomy 38a. For example, for a particular captured content item of the plurality of captured content items, a strength of organizational fit score may be calculated for each node of the plurality of nodes of the hierarchical taxonomy 38a. The strength of organizational fit score for a node is indicative of a degree to which the node is relevant to the particular captured content item. The strength of organizational fit score may be calculated by the score calculation logic 46 stored in the memory component 40. In some embodiments, the strength of organizational fit score may be calculated by a content classifier, which receives as input the particular captured content item and the node and outputs a strength of organizational fit score for the node relative to the particular captured content item. In some embodiments, the strength of organizational fit score is a real number between 0 and 1, where higher numbers are indicative of a better fit. In some embodiments, the strength of organizational fit score is a percentage between 0% and 100%, where higher percentages are indicative of a better fit.

By way of non-limiting example, in an embodiment that includes a first captured content item and a second captured content item, a best fit node for the first captured content item may be determined by calculating a first content strength of organizational fit score for each node of the hierarchical taxonomy 38a relative to the first captured content item. The best fit node for the first captured content item is then determined as the node of the hierarchical taxonomy 38a with the highest first content strength of organizational fit score relative to the first captured content item. Likewise, a best fit node for the second captured content item may be determined by calculating a second content strength of organizational fit score for each node of the hierarchical taxonomy 38a relative to the second captured content item. The best fit node for the second captured content item is the node of the hierarchical taxonomy 38a with the highest second content strength of organizational fit score relative to the second captured content item. A first content organization node may be associated with the first captured content item based on the best fit node of the first captured content item. A second content organization node may be associated with the second captured content item based on the best fit node of the second captured content item. In some embodiments, the first content organization node and the second content organization node are a common content organization node that is a parent of the first content organization node and the second content organization node. In some embodiments, the first content organization node is the best fit node for the first captured content item and the second content organization node is the best fit node for the second captured content item, however embodiments are not limited thereto. A concrete example of the calculation of strength of organizational fit scores and the association of nodes with captured content items will now be provided with reference to FIG. 6.

Figure 6:
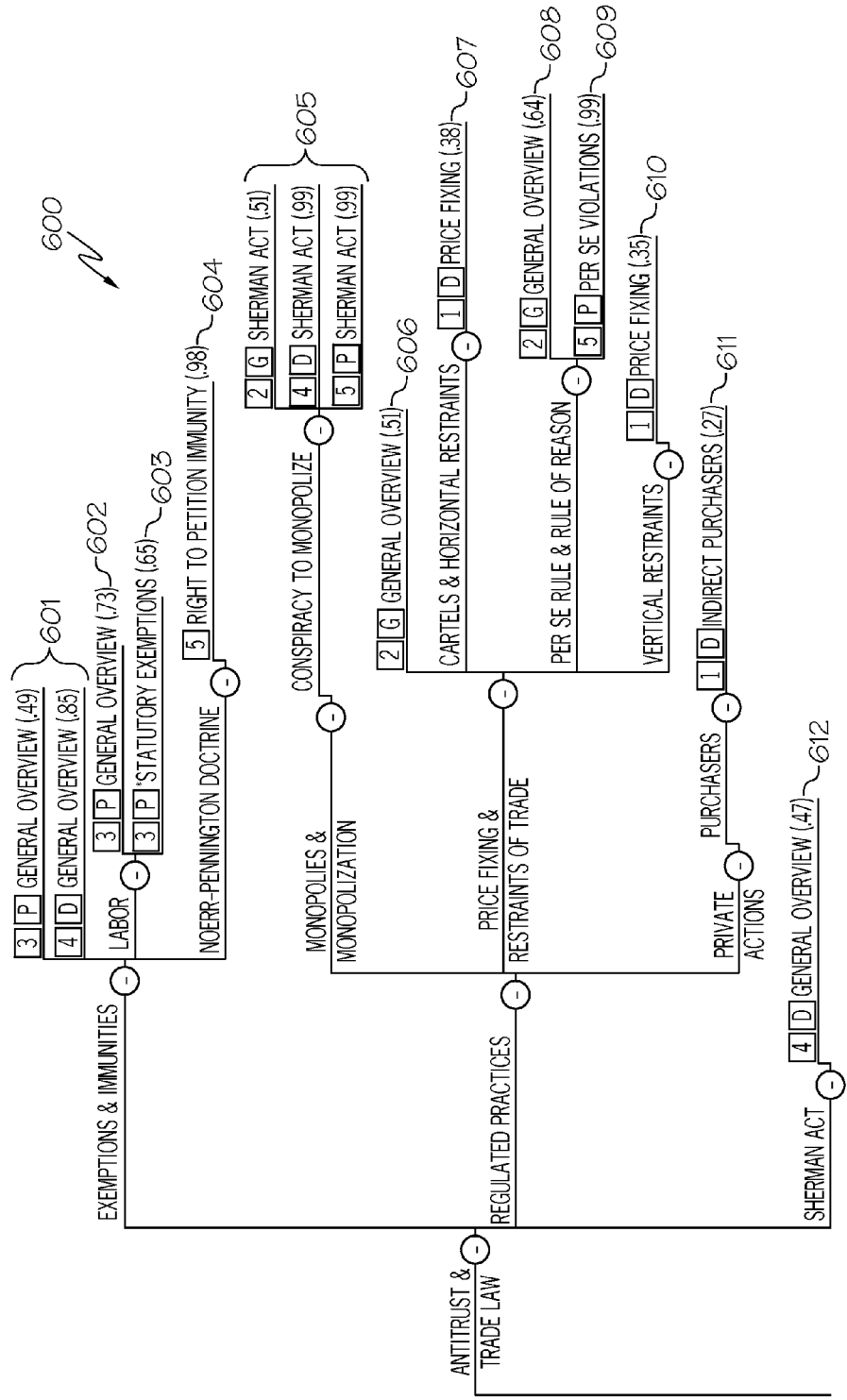
FIG. 6 depicts a schematic illustration of a hierarchical view including the top three most relevant nodes to five captured content items that were captured by three different users of a collaborative team, according to one or more embodiments shown and described herein.

To illustrate the calculation of strength of organizational fit scores for nodes relative to each of the five captured content items of the carried through non-limiting example described herein, FIG. 6 schematically depicts a hierarchical view 600 including the three nodes having the highest strength of organizational fit scores as calculated by a content classifier for each of the five captured content items. A boxed number depicted next to a node corresponds to the number of the captured content item (e.g., the boxed "1" indicates that the node next to it is associated with the first captured content item, the boxed "2" indicates that the node next to it is associated with the second captured content item, the boxed "3" indicates that the node next to it is associated with the third captured content item, the boxed "4" indicates that the node next to it is associated with the fourth captured content item, and the boxed "5" indicates that the node next to it is associated with the fifth captured content item). A boxed letter depicted next to the boxed number corresponds with who captured the content item (e.g., the boxed "D" next to the boxed "1" indicates that Don captured the first captured content item, the boxed "G" next to the boxed "2" indicates that Gary captured the second captured content item, the boxed "P" next to the boxed "3" indicates that Peter captured the third captured content item, the boxed "D" next to the boxed "4" indicates that Don captured the fourth captured content item, and the boxed "P" next to the boxed "5" indicates that Peter captured the fifth captured content item).

Still referring to FIG. 6, the calculated strength of organizational fit score for the nodes relative to the captured content item is shown in parentheses after the node. In particular, a first node 601 (Antitrust & Trade Law<Exemptions & Immunities<General Overview) has a 0.49 strength of organizational fit score relative to the third captured content item. The first node 601 has a 0.85 strength of organizational fit score relative to the fourth captured content item. A second node 602 (Antitrust & Trade Law<Exemptions & Immunities<Labor<General Overview) has a 0.73 strength of organizational fit score relative to the third captured content item. A third node 603 (Antitrust & Trade Law<Exemptions & Immunities<Labor<Statutory Exemptions) has a 0.65 strength of organizational fit score relative to the third captured content item. A fourth node 604 (Antitrust & Trade Law<Exemptions & Immunities<Noerr-Pennington Doctrine<Right to Petition Immunity) has a 0.98 strength of organizational fit score relative to the fifth captured content item. A fifth node 605 (Antitrust & Trade Law<Regulated Practices<Monopolies & Monopolization<Conspiracy to Monopolize<Sherman Act) has a 0.51 strength of organizational fit score relative to the second captured content item. The fifth node 605 has a 0.99 strength of organizational fit score relative to the fourth captured content item. The fifth node 605 has a 0.99 strength of organizational fit score relative to the fifth captured content item. A sixth node 606 (Antitrust & Trade Law<Regulated Practices<Price Fixing & Restraints of Trade<General Overview) has a 0.51 strength of organizational fit score relative to the second captured content item. A seventh node 607 (Antitrust & Trade Law<Regulated Practices<Price Fixing & Restraints of Trade<Cartels & Horizontal Restraints<Price Fixing) has a 0.38 strength of organizational fit score relative to the first captured content item. An eight node 608 (Antitrust & Trade Law<Regulated Practices<Price Fixing & Restraints of Trade<Per Se Rule & Rule of Reason<General Overview) has a 0.64 strength of organizational fit score relative to the second captured content item. A ninth node 609 (Antitrust & Trade Law<Regulated Practices<Price Fixing & Restraints of Trade<Per Se Rule & Rule of Reason<Per Se Violations) has a 0.99 strength of organizational fit score relative to the fifth captured content item. A tenth node 610 (Antitrust & Trade Law<Regulated Practices<Price Fixing & Restraints of Trade<Vertical Restraints<Price Fixing) has a 0.35 strength of organizational fit score relative to the first captured content item. An eleventh node 611 (Antitrust & Trade Law<Regulated Practices<Private Actions<Purchasers<Indirect Purchasers) has a 0.27 strength of organizational fit score relative to the first captured content item. A twelfth node 612 (Antitrust & Trade Law<Sherman Act<General Overview) has a 0.47 strength of organizational fit score relative to the fourth captured content item.

Still referring to block 306 of FIG. 3, a node for which a strength of organizational fit score has been calculated may then be associated with the particular captured content item based on the strength of organizational fit score of the node. For example, in some embodiments in which the strength of organizational fit score is calculated for each node of the hierarchical taxonomy 38a relative to a first captured content item, the node with the highest strength of organizational fit score relative to the first captured content item is associated with the first captured content item as a best fit content organization node. Returning to the carried through non-limiting example described herein and referring to FIG. 6, the best fit content organization node for the first captured content item is the seventh node 607 because its 0.38 strength of organizational fit score relative to the first captured content item is higher than the strength of organizational fit scores of the other two nodes associated with the first captured content item (e.g., the eleventh node 611 having a score of 0.27 relative to the first captured content item and the tenth node 610 having a score of 0.35 relative to the first captured content item). Similarly, the best fit content organization node for the other four captured content items may be determined as the node having the highest strength of organizational fit score relative to the captured content item. In some embodiments, when the node having the highest strength of organizational fit score relative to the captured content item is a "General Overview" node, the best fit content organization node may be determined to be the parent node of the "General Overview" node. For example, in FIG. 3, the second node 602 has the highest strength of organizational fit score relative to the second captured content item, but the second node 602 is a general overview. Accordingly, the best fit content organization node for the second captured content item may be determined to be the parent node of the second node 602 (i.e., the Antitrust & Trade Law<Exemptions & Immunities<Labor node).

In some embodiments, one of the nodes of the hierarchical taxonomy 38a is associated with a captured content item when the calculated strength of organizational fit score reaches or exceeds an automatic association threshold score (e.g., greater than 50%, greater than 60%, etc.). In such embodiments, multiple content organization nodes may be automatically associated with a single captured content item. In some embodiments in which the strength of organizational fit score is calculated for one of the nodes of the hierarchical taxonomy 38a, the node may not be automatically associated with the captured content when the strength of organizational fit score does not meet or exceed the automatic association threshold score. In some embodiments, the content organization nodes may be identified in a way that does not include calculating a strength of organizational fit score or using a content classifier.

In some embodiments in which a strength of organizational fit score is calculated for one of the nodes of the hierarchical taxonomy 38a, the node may be provided for display as a content organization node suggestion when the strength of organizational fit score exceeds a suggestion threshold score. The node suggestion may be generated by the node suggestion logic 45 stored in the memory component 40. For example, referring now to FIG. 5, a strength of organizational fit score for the node "patent injunction" of the hierarchical taxonomy 38a may be calculated based on the captured content of the highlighted text portion 512. The strength of organizational fit score may be calculated as 0.45, which may be below an automatic association threshold score of 0.5, but may be above a suggestion threshold score of 0.4. Since the calculated strength of organizational fit score exceeds the suggestion threshold score of 0.4, the "patent injunction" node may be provided for display in the recommended content organization node area 516. After displaying the "patent injunction" content organization node suggestion, the server computing device 12b may receive input indicative of a selection of the "patent injunction" content organization node suggestion (e.g., input indicative that the user has clicked on or otherwise selected the "patent injunction" node and clicked on or otherwise selected the save button 522). After receiving the input indicative of the selection of the "patent injunction" content organization node suggestion, the server computing device 12b may associate the "patent injunction" node with the captured content. By displaying content organization node suggestions when a strength of organizational fit score of the node exceeds a suggestion threshold score, but does not exceed an automatic association threshold score, nodes for which the server computing device 12b does not have sufficient confidence to automatically applied may be applied when appropriate by providing some discretion to the user.

Referring once again to FIG. 3, at block 308, the display logic 48 stored in the memory component 40, when executed by the processor 30, causes the server computing device to display a hierarchical view including the content organization nodes. In some embodiments, the hierarchical view of the content organization nodes is displayed on the user computing device 12a in response to a message transmitted to the user computing device 12a from the server computing device 12b. The hierarchical view includes the plurality of content organization nodes associated with the plurality of captured content items at block 306. The hierarchical view includes, for each of the plurality of content organization nodes, a graphical representation that the content organization node is associated with at least one of the plurality of captured content items. In embodiments that include a first content organization node associated with a first captured content item and a second content organization node associated with a second captured content item, the graphical representation indicates that the first captured content item is associated with the first content organization node and that the second captured content item is associated with the second content organization node.

Figure 7:
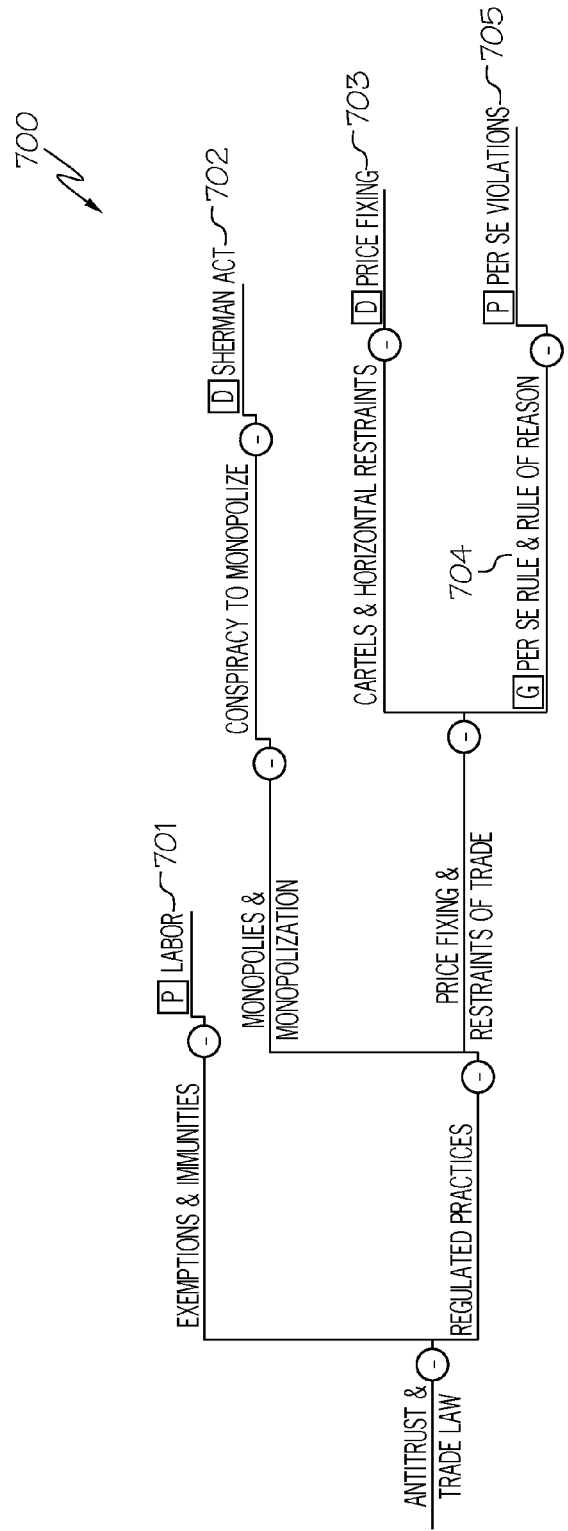
FIG. 7 depicts a schematic illustration of a graphical user interface including a concentrated hierarchical view including a graphical representation of which content organization nodes are associated with captured content items, according to one or more embodiments shown and described herein.

For example, referring once again to the carried through non-limiting example and to FIG. 7, a first node 701 may be associated with the third captured content item captured by Peter, a second node 702 may be associated with the fourth captured content item captured by Don, a third node 703 may be associated with the first captured content item captured by Don, a fourth node 704 may be associated with the second captured content item captured by Gary, and a fifth node 705 may be associated with the fifth captured content item captured by Peter. Each of the first node 701, the second node 702, the third node 703, the fourth node 704, and the fifth node 705 include a graphical representation indicating that each respective content organization node is associated with a captured content item. In some embodiments, the graphical representation that a node is associated with a captured content item includes a capture attribute icon displayed near the node. In some embodiments, the capture attribute icon is indicative of an attribute pertaining to a capturing of the captured content item associated with the content organization node. The capture attribute icon may be indicative of a user that captured the captured content item associated with the node, may be indicative of a time of capture for a captured content item associated with the node, may be indicative of a content type of the captured content item associated with the node, or the like. In the embodiment depicted in FIG. 7, the capture attribute icon is indicative of a user that captured the captured content item associated with the node (e.g., the boxed "P" icon next to the first node 701 indicates that a captured content item captured by Peter is associated with the first node 701, the boxed "D" icon next to the second node 702 indicates that a captured content item captured by Don is associated with the second node 702, the boxed "D" icon next to the third node 703 indicates that a captured content item captured by Don is associated with the third node 703, the boxed "G" icon next to the fourth node 704 indicates that a captured content item captured by Gary is associated with the fourth node 704, and the boxed "P" icon next to the fifth node 705 indicates that a captured content item captured by Peter is associated with the fifth node 705). In some embodiments, the association between a captured content item and a content organization node may be indicated in another manner, such as by highlighting or color-coding the node to indicate that one or more captured content items are associated with the node, or otherwise graphically distinguishing the node from a node that does not have associated captured content items.

By presenting a hierarchical view depicting content organization nodes associated with captured content that graphically differentiates which nodes are associated with content captured by a user or multiple users on a team, a user or team member may intuitively and efficiently understand the subject matter or classification of multiple pieces of captured content from a quick visual review of the displayed hierarchical view. Furthermore, the user may be able to identify areas to further explore for additional information, such as by identifying content organization nodes that are associated with multiple content organization nodes. In some embodiments, a user may click or otherwise select one of the displayed content organization nodes in order to be presented with the captured content items associated with the node. For example, a user may click or otherwise select the first node 701 (FIG. 7) to retrieve a list of captured content items associated with the node. In such embodiments, the system may receive input indicative of the selected first node 701 and may identify one or more documents associated with the first node 701. The identified documents may be presented to the user in a variety of forms, such as in a list view, or the like. The user may then explore the identified documents and potentially capture additional content, which may be processed as described above and included in the hierarchical view in the manner described above.

Figure 8:
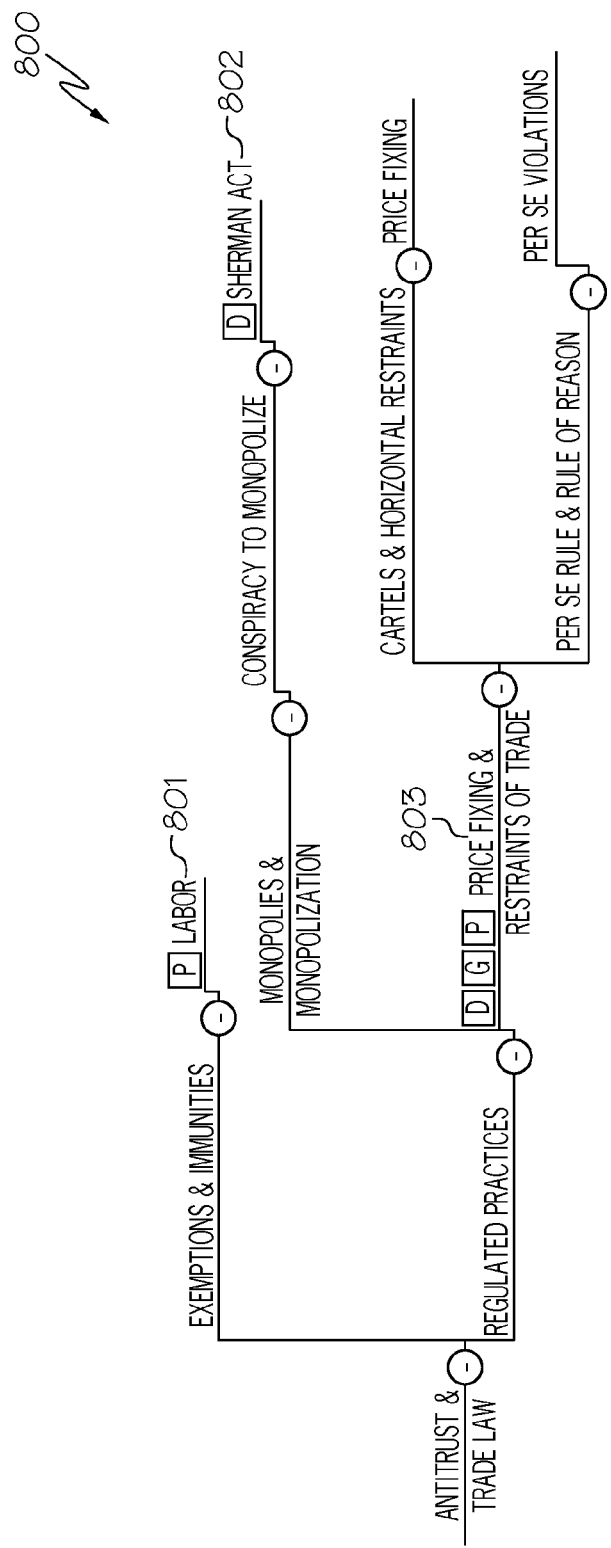
FIG. 8 depicts a schematic illustration of a graphical user interface including a higher spread hierarchical view including a graphical representation of which content organization nodes are associated with captured content items, according to one or more embodiments shown and described herein.

In some embodiments, the plurality of content identification nodes may be associated with the plurality of captured content items based on a spread factor. In some contexts it may be desirable to concentrate the organization of the captured content items among less nodes while in other embodiments it may be desirable to spread out the organization of the captured content items among more nodes. For example, FIG. 7 depicts an embodiment of a high spread hierarchical view 700 in which the five captured content items of the carried through example are each associated with a single node. In contrast, FIG. 8 depicts an embodiment of a concentrated hierarchical view 800 in which a first node 801 is associated with the third captured content item captured by Peter, the second node 802 is associated with the fourth captured content item captured by Don, and the third node 803 is associated with the first captured content item captured by Don, the second captured content item captured by Gary, and the fifth captured content item captured by Peter. In embodiments in which it is desirable to have a more concentrated hierarchical view, such as depicted in FIG. 8, a common content organization node (e.g., the third node 803) may be determined for the first captured content item, the second captured content item, and the fifth captured content item because each of the best fit content organization nodes for these content items (as described above) share the third node 803 as a parent node. Thus, in some embodiments a plurality of captured content items whose best fit content organization node share a common parent node may each be associated with the common parent node such that the common parent node is the content organization node for each of the captured content items. Rules for associating content organization nodes with captured content items may be based on a spread factor (which may be automatically assigned or set by a user), a number of collaborators, a strength of organizational fit score for one or more nodes, a commonality of parent nodes, or the like. For example, in some embodiments, content organization nodes may be associated with captured content items using an auto-organization algorithm that associates a captured content item with a content organization node based on a strength of organizational fit score, unless three or more captured content items are associated with a node having a common parent node, in which case the captured content items having the common parent node will be associated with the common parent node. In some embodiments, the hierarchical view may be auto-organized by re-associating the captured content items with nodes of the hierarchical taxonomy 38a based on a desired level of spread. Such an auto-organization function may facilitate a control of the degree of spread or concentration of the captured content items among the content organization nodes.

In some embodiments, the displayed hierarchical view may be a pruned hierarchical view. A pruned hierarchical view is a hierarchical view in which one or more branches of the tree displayed in the hierarchical view are not displayed when no node of the branch is relevant to captured content. By way of non-limiting example, FIG. 7 schematically depicts a pruned hierarchical in which only branches with nodes having associated captured content items are displayed. By displaying a pruned hierarchical view, unnecessary clutter may be removed from the display, which may allow a user to more easily identify which branches are most relevant to the captured content.

Figure 9:
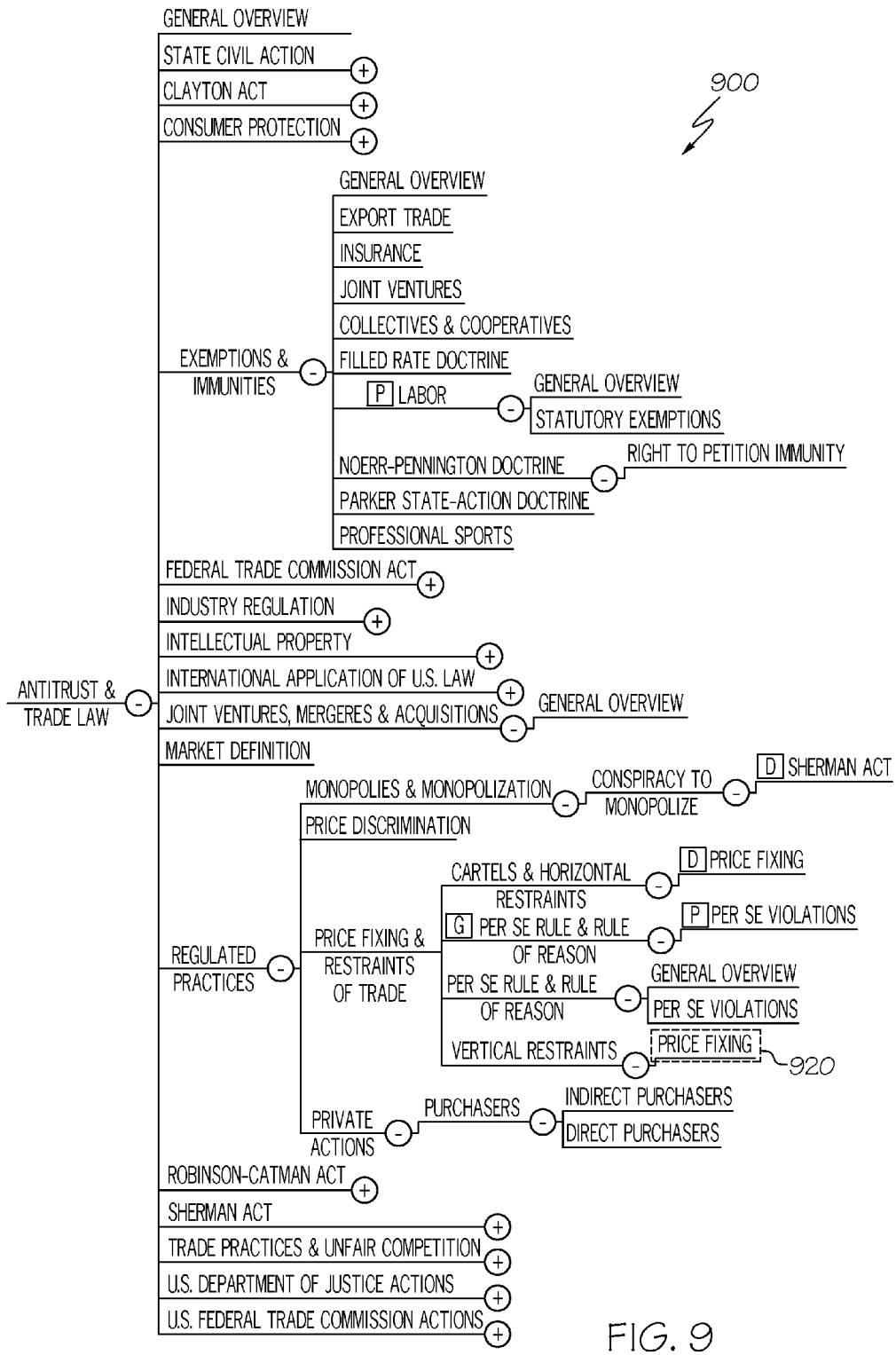
FIG. 9 depicts a schematic illustration of a graphical user interface including a full unpruned view of a hierarchical view including a graphical representation of which content organization nodes are associated with captured content items as well as nodes and branches that are not associated with captured content items, according to one or more embodiments shown and described herein.

In some embodiments, the displayed hierarchical view may be an unpruned hierarchical view. An unpruned hierarchical view is a hierarchical view in which at least one branch or leaf of the tree is displayed that does not have a captured content item associated with it. For example, FIG. 9 depicts an unpruned version of the pruned hierarchical view depicted in FIG. 7. Such unpruned views may facilitate the exploration for additional captured content by allowing nodes with no captured content associated to be explored, perhaps uncovering additional material relevant to a research objective. In some embodiments, one or more of the content organization nodes displayed in the hierarchical view may be highlighted to indicate that other content associated with the highlighted node may be relevant to the captured content. For example, FIG. 9 shows a highlighted "Price Fixing" node 920, which indicates that additional uncaptured documents associated with the "Price Fixing" node 920 may be relevant to a research objective. In some embodiments, a user may click or otherwise select the "Price Fixing" node 920. The system may receive input indicative of the selected "Price Fixing" node 920 and may identify one or more documents associated with the "Price Fixing" node 920, some of which may not be associated with any of the captured content, thereby allowing a user to expand a search or to review previously undiscovered content. The identified documents may be presented to the user in a variety of forms, such as in a list view, a cluster view, or the like. The user may then explore the identified documents and potentially capture additional content, which may be processed as described above and included in the hierarchical view in the manner described above.

Figure 4:
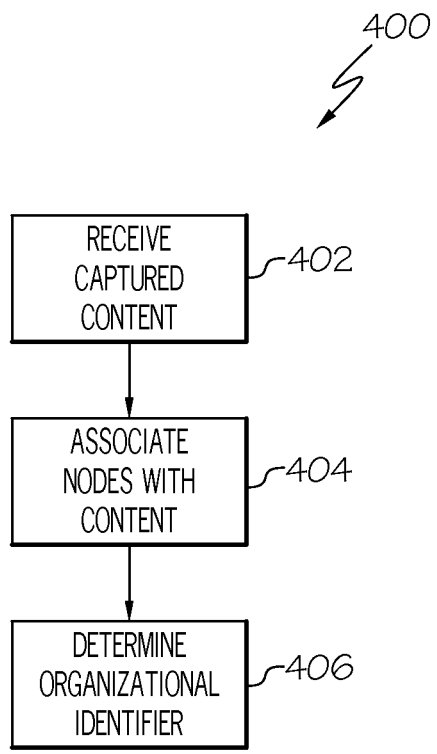
FIG. 4 depicts a flowchart for a method of determining an organizational identifier for captured content, according to one or more embodiments shown and described herein.

Referring now to FIG. 4, a flowchart that graphically illustrates a method 400 of determining an organizational identifier for captured content is provided. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order.

Still referring to FIG. 4, at block 402, captured content is received. The captured content may be received in the same manner as described above with respect to block 304 of FIG. 3. At block 404, a plurality of content organization nodes (e.g., all nodes of the hierarchical taxonomy that have strength of organizational fit score above a threshold) are associated with each of the captured content items received at block 402 as described above with respect to block 306 of FIG. 3. The hierarchical taxonomy 38a described above includes a plurality of nodes from which the plurality of content organization nodes may be identified in the manner described above.

Still referring to FIG. 4, at block 406, an organizational identifier for the captured content is determined based on the plurality of content organization nodes. In some embodiments, the organizational identifier is a content organization node, such as one of the content organization nodes of the hierarchical taxonomy 38a, such that captured content may be organized and stored with the content organization node. In some embodiments, the organizational identifier is a folder, such as a client matter folder or content repository folder into which related content may be stored and later retrieved.

Still referring to block 406 of FIG. 4, in some embodiments, the organizational identifier may be determined based on the plurality of content organization nodes and the organizational identifier of a previously captured content item that shares one or more of the plurality of content organization nodes, such that the captured content item may be organized with the previously captured content item when appropriate. In some embodiments, the organizational identifier for the captured content item will be determined as the organizational identifier of the previously captured content item when the captured content and the previously captured content share a threshold number of content organization nodes (e.g., greater than 5, greater than 10, etc.).

Accordingly, it should be understood that embodiments described herein display hierarchical views of content organization nodes associated with captured content and for determining organizational identifiers for captured content. By presenting a hierarchical view depicting content organization nodes associated with various captured content items, a user may intuitively and efficiently understand the subject matter or classification of multiple pieces of captured content from a quick visual review of the displayed hierarchical view. Furthermore, such a hierarchical view may facilitate the review and collaboration of a team of users capturing and sharing content with one another. Furthermore, by determining organizational identifiers for captured content based on content organization nodes, captured content may be better organized and classified for later retrieval and analysis.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for providing for display a hierarchical view including content organization nodes associated with captured content items, the method comprising:
providing a hierarchical taxonomy including a plurality of content organization nodes;
receiving, at a computer, a plurality of captured content items that were captured by a user during a content search;
providing a user option to associate a content organization node from the plurality of content organization nodes with a designated captured content item from the plurality of captured content items;
in response to receiving a user selection of the user option, associating the content organization node with the designated captured content item, wherein the designated captured content item is associated with at least one of the plurality of content organization nodes; and
providing for display the hierarchical view including the plurality of content organization nodes, wherein the hierarchical view includes, for each of the plurality of content organization nodes, a graphical representation that the content organization node is associated with at least one of the plurality of captured content items,
wherein the graphical representation includes a capture attribute icon displayed near the content organization node, wherein the capture attribute icon indicates at least one of the following: a user that captured the designated captured content item associated with the content organization node, a time of capture for the designated captured content item associated with the content organization node, or a content type of the designated captured content item associated with the content organization node.

2. The method of claim 1, wherein:
the plurality of captured content items includes a first captured content item and a second captured content item;
the plurality of content organization nodes includes a first content organization node and a second content organization node;
the first captured content item is associated with the first content organization node;
the second captured content item is associated with the second content organization node; and
the graphical representation indicates that the first captured content items is associated with the first content organization node and that the second captured content item is associated with the second content organization node.

3. The method of claim 2, further comprising:
calculating a strength of organizational fit score for a node of the plurality of nodes, wherein the strength of organizational fit score is indicative of a degree to which the node is relevant to the first captured content item; and
associating the node with the first captured content item as the first content organization node based on the strength of organizational fit score.

4. The method of claim 3, further comprising:
calculating the strength of organizational fit score for each node of the plurality of nodes; and
associating the node with the highest strength of organizational fit score with the first captured content item as the first content organization node.

5. The method of claim 2, further comprising:
determining a best fit node for the first captured content item by calculating a first content strength of organizational fit score for each node of the plurality of nodes, wherein the best fit node for the first captured content item is the node of the plurality of nodes with the highest first content strength of organizational fit score;
determining a best fit node for the second captured content item by calculating a second content strength of organizational fit score for each node of the plurality of nodes, wherein the best fit node for the second captured content item is the node of the plurality of nodes with the highest second content strength of organizational fit score; and
at least one of the first content organization node and the second content organization node is determined based on at least one of the best fit node for the first captured content item and the best fit node for the second captured content item.

6. The method of claim 5, wherein the first content organization node and the second content organization node are a common content organization node, wherein the common content organization node is a parent node of the first content organization node and a parent node of the second content organization node.

7. The method of claim 5, wherein the first content organization node is the best fit node for the first captured content item and the second organization node is the best fit node for the second captured content item.

8. The method of claim 1, wherein the plurality of content organization nodes are associated with the plurality of captured content items based on a spread factor.

9. The method of claim 1, wherein the graphical representation includes highlighting at least one of the plurality of content organization nodes to indicate that at least one of the plurality of captured content items is associated with the highlighted node.

10. A method for providing for display a hierarchical view including content organization nodes associated with captured content items, the method comprising:
providing a hierarchical taxonomy including a plurality of nodes;
receiving, at a computer, a plurality of captured content items, the plurality of captured content items including a first captured content item and a second captured content item;
providing a user option to associate a plurality of content organization nodes from the plurality of nodes with a first captured content item and a second captured content item;
in response to selection of the user option, associating a plurality of content organization nodes from the plurality of nodes with the plurality of content organization nodes including a first content organization node and a second content organization node, wherein the first captured content item is associated with the first content organization node, and wherein the second captured content item is associated with the second content organization node; and providing for display the hierarchical view including the plurality of content organization nodes, wherein the hierarchical view includes a graphical representation that the first captured content items is associated with the first content organization node and that the second captured content item is associated with the second content organization node, wherein the graphical representation includes a first capture attribute icon displayed near the first content organization node and a second capture attribute icon displayed near the second content organization node, wherein the first capture attribute icon is indicative of an attribute pertaining to a capturing of the first captured content item, and the second capture attribute icon is indicative of an attribute pertaining to a capturing of the second captured content item.

11. The method of claim 10, wherein:

the first capture attribute icon is indicative of a first user that captured the first captured content item, a first time of capture of the first captured content item, or a first content type of the first captured content item; and the second capture attribute icon is indicative of a second user that captured the second captured content item, a second time of capture of the second captured content item, or a second content type of the second captured content item.

12. The method of claim 10, wherein the first capture attribute icon is indicative of a first user that captured the first captured content item and the second capture attribute icon is indicative of a second user that captured the second captured content item.

13. A method of determining an organizational identifier for captured content, the method comprising:

providing a hierarchical taxonomy including a plurality of content organization nodes;

receiving, at a computer, a captured content item that was captured by a user during a content search;

determining a recommended content organization node from the plurality of content organization nodes to associate with the captured content item;

providing a user option to associate the recommended content organization node with the captured content item;

in response to receiving a user selection of the user option, associating the recommended content organization node with the captured content item;

determining the organizational identifier for the captured content item based on the recommended content organization node;

providing for display a hierarchical view including the plurality of content organization nodes, wherein the hierarchical view includes a capture attribute icon displayed near the first content organization node, wherein the capture attribute icon indicates at least one of the following: a user that captured the captured content item associated with the first content organization node, a time of capture for the captured content item associated with the first content organization node, or a content type of the captured content item associated with the first content organization node.

14. The method of claim 13, wherein:

the organizational identifier for the captured content item is determined by accessing an organizational identifier of a previously captured content item; and the organizational identifier for the captured content item is determined as the organizational identifier of the previously captured content item when the captured content item and the previously captured content item share a threshold number of content organization nodes.

15. The method of claim 13, further comprising:

providing a hierarchical taxonomy including a plurality of nodes, wherein the plurality or content organization nodes are identified from the plurality of nodes of the hierarchical taxonomy.

16. The method of claim 15, further comprising:

calculating a strength of organizational fit score for a node of the plurality of nodes, wherein the strength of organizational fit score is indicative of a degree to which the node is relevant to the first captured content item.

* * * * *